(12) United States Patent
Tsai

(10) Patent No.: US 12,197,073 B2
(45) Date of Patent: *Jan. 14, 2025

(54) OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

(71) Applicant: KEIWA Incorporated, Tokyo (JP)

(72) Inventor: Chengheng Tsai, Tokyo (JP)

(73) Assignee: KEIWA INCORPORATED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,396

(22) Filed: Jan. 4, 2024

(65) Prior Publication Data

US 2024/0152005 A1 May 9, 2024

Related U.S. Application Data

(63) Continuation of application No. PCT/JP2022/024795, filed on Jun. 22, 2022.

(30) Foreign Application Priority Data

Jul. 6, 2021 (JP) ................. 2021-111866

(51) Int. Cl.
*G02F 1/13357* (2006.01)
*G02B 5/02* (2006.01)
*G02F 1/1335* (2006.01)

(52) U.S. Cl.
CPC ..... *G02F 1/133606* (2013.01); *G02B 5/0268* (2013.01); *G02B 5/0278* (2013.01); *G02F 1/133614* (2021.01)

(58) Field of Classification Search
CPC ......... G02F 1/133606; G02F 1/133614; G02F 1/133607; G02F 1/133603; G02B 5/045;
(Continued)

(56) References Cited

U.S. PATENT DOCUMENTS 11,143,914 B2* 10/2021 Tsai .................... G02B 5/0278
11,333,924 B1* 5/2022 Lv .................... G02F 1/133612
(Continued)

FOREIGN PATENT DOCUMENTS

JP 2011-129277 A 6/2011
JP 2020-079920 A 5/2020
(Continued)

OTHER PUBLICATIONS

International Search Report and Written Opinion for PCT/JP2022/024795 (ISA/JP) mailed Aug. 23, 2022 w/English translation (8 pages).

*Primary Examiner* — Erin Kryukova
(74) *Attorney, Agent, or Firm* — Alston & Bird LLP

(57) ABSTRACT

An optical sheet laminate 100 is to be incorporated into a backlight unit 40 having blue light sources 42. The optical sheet laminate 100 include: a diffusion sheet 43 having a first surface 21a having a plurality of recesses 22 having a substantially inverted quadrangular pyramid shape; and a pair of prism sheets 44 and 45 having prism extending directions perpendicular to each other. The diffusion sheet 43 includes one or a plurality of diffusion sheets in layers. The plurality of recesses 22 are arranged in a two-dimensional matrix, and the intersecting angle between an arrangement direction of the plurality of recesses 22 and the prism extending direction is 20° or more and 70° or less.

16 Claims, 8 Drawing Sheets

(58) Field of Classification Search
CPC .. G02B 5/0278; G02B 6/0035; G02B 6/0036; G02B 6/0038
See application file for complete search history.

(56) References Cited

U.S. PATENT DOCUMENTS

| | | | | |
|---|---|---|---|---|
| 2007/0195523 | A1* | 8/2007 | Chang | G02F 1/133606 362/225 |
| 2009/0268430 | A1* | 10/2009 | Suzuki | G02B 5/0231 362/97.1 |
| 2010/0008062 | A1* | 1/2010 | Chang | G02F 1/133606 359/599 |
| 2010/0208170 | A1* | 8/2010 | Tanoue | B60K 35/00 349/65 |
| 2011/0002140 | A1* | 1/2011 | Tsukahara | B32B 27/36 428/480 |
| 2015/0177444 | A1 | 6/2015 | Saito | |
| 2020/0292881 | A1 | 9/2020 | Tsai et al. | |
| 2020/0341335 | A1 | 10/2020 | Tsai et al. | |
| 2021/0072598 | A1* | 3/2021 | Walker | G02F 1/133611 |
| 2021/0197725 | A1 | 7/2021 | Imamura et al. | |
| 2022/0004058 | A1 | 1/2022 | Tsai et al. | |
| 2022/0326571 | A1 | 10/2022 | Tsai et al. | |
| 2022/0390841 | A1 | 12/2022 | Jang et al. | |

FOREIGN PATENT DOCUMENTS

| | | | |
|---|---|---|---|
| KR | 10-2019-0114872 A | 10/2019 | |
| TW | M388660 U1 | 9/2010 | |
| TW | 201319645 A1 | 5/2013 | |
| TW | 202108583 A | 3/2021 | |
| WO | WO-2010010840 A1 * | 1/2010 | ........... G02B 5/0215 |

* cited by examiner

FIG.6
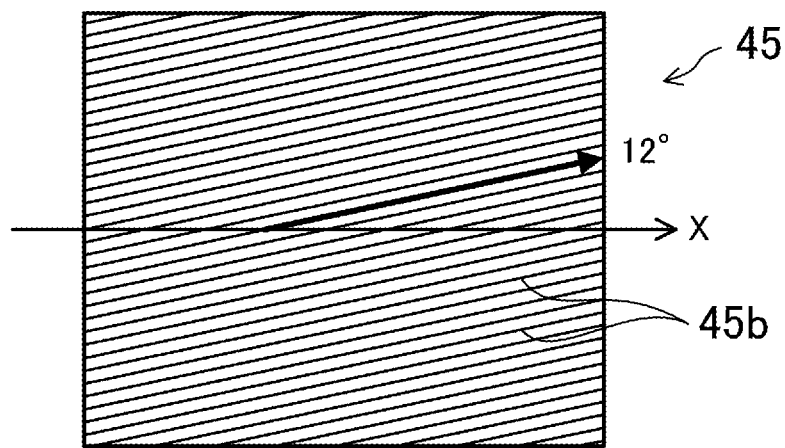
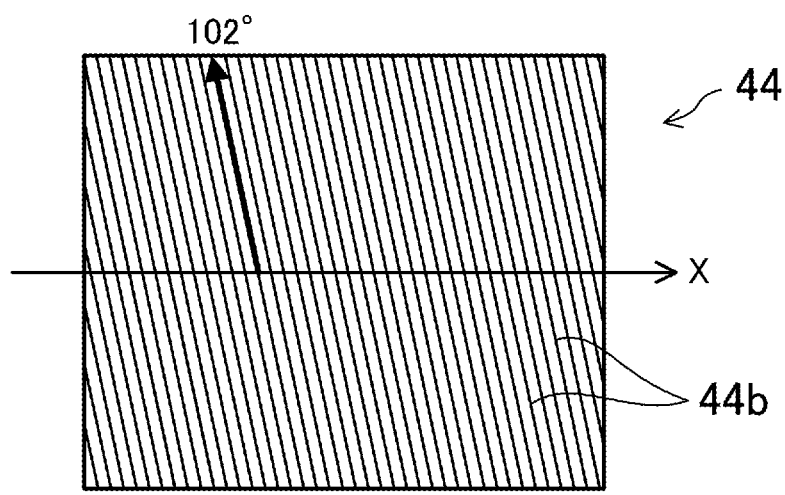
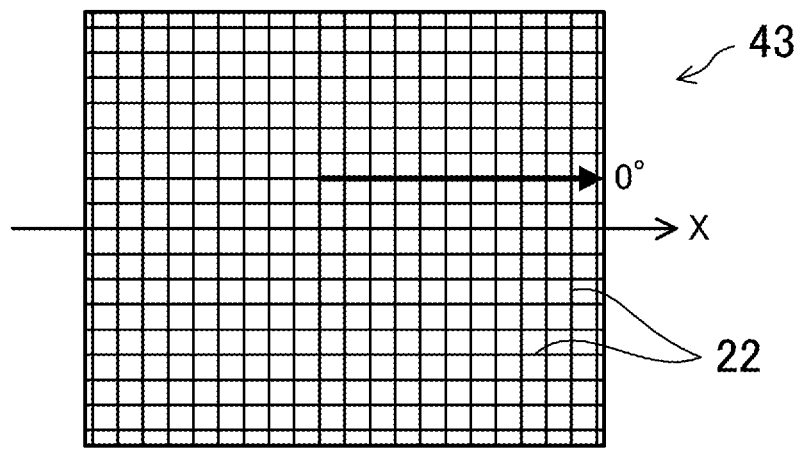

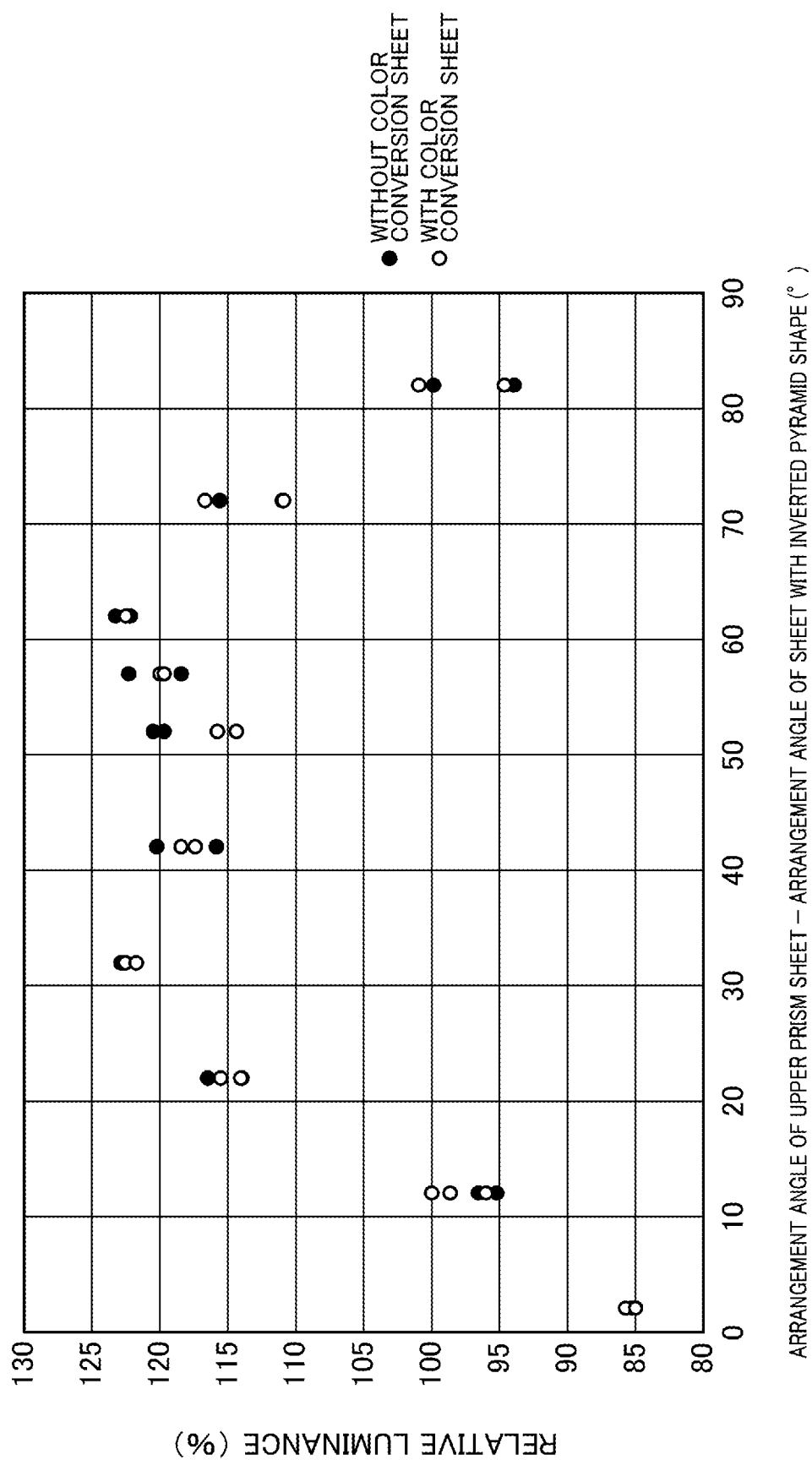

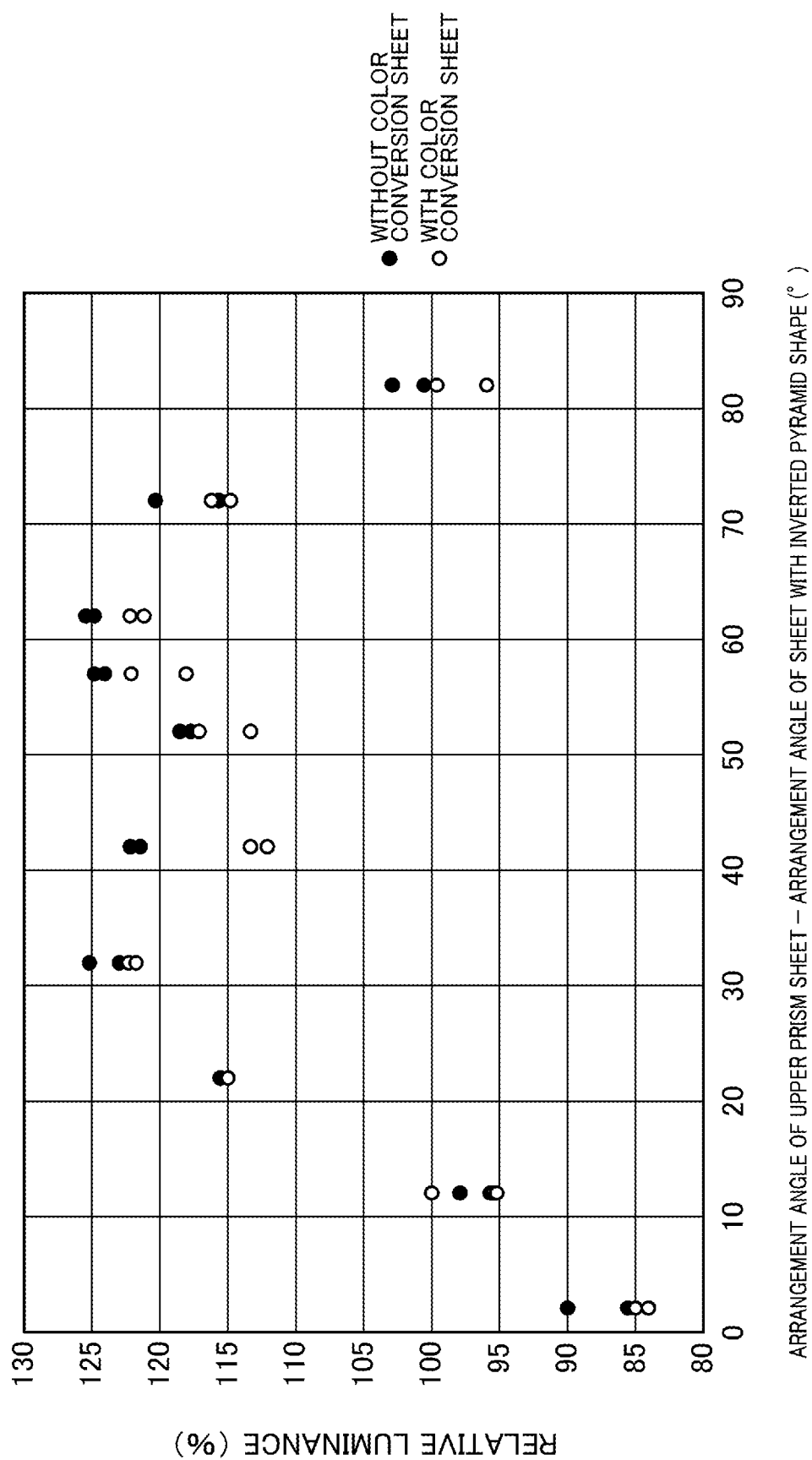

1

OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

CROSS REFERENCE TO RELATED APPLICATIONS

This application is a bypass continuation of International Application No. PCT/JP2022/024795, filed Jun. 22, 2022, which international application claims priority to and the benefit of Japanese Application No. 2021-111866, filed Jul. 6, 2021; the contents of both of which as are hereby incorporated by reference herein in their respective entireties.

BACKGROUND

The present disclosure relates to an optical sheet laminate, a backlight unit, a liquid crystal display device, an information apparatus, and a method for manufacturing the backlight unit.

In recent years, liquid crystal display devices (hereinafter referred to as liquid crystal displays in some cases) have been widely used as display devices for various information apparatuses such as smartphones and tablet terminals. A major type of a backlight of a liquid crystal display is a direct type in which light sources are arranged on a back surface of a liquid crystal panel, or an edge light type in which light sources are arranged near a side surface of a liquid crystal panel.

When the direct-type backlight is adopted, an optical sheet such as a diffusion sheet or a prism sheet is used to diffuse light emitted from a light source such as a light emitting diode (LED) to improve uniformity of luminance and chromaticity over the entire screen (e.g., see Patent Document 1).

A direct-type backlight unit for a thin display such as a laptop computer or a tablet computer is used with, e.g., a diffusion sheet having two-dimensionally arranged recesses having an inverted pyramid shape, where two prism sheets having prism ridges perpendicular to each other are usually arranged above the diffusion sheet (i.e., closer to a display screen).

Patent Document 1: Japanese Unexamined Patent Publication No. 2011-129277

SUMMARY

Portable information equipment such as a laptop computer, a tablet computer and the like, which are carried around and used, requires still lower power consumption. Accordingly, an optical sheet incorporated in a backlight unit is required to achieve a high-luminance screen with low power.

It is an object of the present disclosure to achieve a high-luminance screen with low power in a backlight unit.

To achieve the object, an optical sheet laminate of the present disclosure to be incorporated into a backlight unit using blue light sources includes: a diffusion sheet having surfaces, at least one of which having a plurality of recesses having a substantially inverted quadrangular pyramid shape; and a pair of prism sheets having prism extending directions perpendicular to each other. The diffusion sheet includes one or a plurality of diffusion sheets in layers. The plurality of recesses are arranged in a two-dimensional matrix, and an intersecting angle between an arrangement direction of the plurality of recesses and the prism extending direction is 20° or more and 70° or less.

With the same light sources, the same electric power, and the same optical sheet layer configuration, the optical sheet laminate of the present disclosure enables higher luminance than when the angle difference between the arrangement direction of the recesses (inverted quadrangular pyramids) of the diffusion sheet and the prism extending direction of the prism sheets is near 0° or near 90°. Thus, a high-luminance screen can be achieved with low power in the backlight unit.

The optical sheet laminate of the present disclosure enables still higher luminance when the intersecting angle is 25° or more and 35° or less, or 55° or more and 65° or less.

A backlight unit of the present disclosure to be built in a liquid crystal display device and leading light emitted from blue light sources toward a display screen via a color conversion sheet includes the optical sheet laminate of the present disclosure between the display screen and the blue light sources. The diffusion sheet is arranged between the blue light sources and the pair of prism sheets.

The backlight unit of the present disclosure includes the optical sheet laminate of the present disclosure, and thus a high luminance screen can be achieved with low power.

In the backlight unit of the present disclosure, the blue light sources may be arranged on a reflection sheet provided on an opposite side of the display screen when viewed from the diffusion sheet. This causes multiple reflections between the diffusion sheet and the reflection sheet thus causing further light diffusion, and thus the luminance uniformity is improved.

In the backlight unit of the present disclosure, the diffusion sheet may include a plurality of diffusion sheets in layers and be arranged between the pair of prism sheets and the blue light sources. Accordingly, the plurality of diffusion sheets repeatedly diffuse the light traveling straight from the blue light sources, thus improving the luminance uniformity.

In the backlight unit of the present disclosure, the distance between the blue light sources and the diffusion sheet may be 5 mm or less, preferably 2.5 mm or less, and more preferably 1 mm or less. This contributes to downsizing of the backlight unit.

In the backlight unit of the present disclosure, the color conversion sheet may be arranged between the blue light sources and the diffusion sheet or between the diffusion sheet and the pair of prism sheets. Accordingly, the color conversion sheet can convert the light emitted from the blue light source into white light.

A liquid crystal display device of the present disclosure includes the backlight unit of the present disclosure and a liquid crystal display panel.

The liquid crystal display device of the present disclosure includes the backlight unit of the present disclosure, and thus a high luminance screen can be achieved with low power.

An information apparatus of the present disclosure includes the liquid crystal display device of the present disclosure.

The information apparatus of the present disclosure includes the liquid crystal display device of the present disclosure, and thus a high luminance screen can be achieved with low power.

A method of the present disclosure for manufacturing a backlight unit to be built in a liquid crystal display device and leading light emitted from blue light sources toward a display screen via a color conversion sheet includes: arranging one or a plurality of diffusion sheets between the blue light sources and the display screen, where the diffusion sheet has surfaces, at least one of which has a plurality of recesses having a substantially inverted quadrangular pyramid shape; and arranging a pair of prism sheets between the diffusion sheet and the display screen, where the pair of prism sheets have prism extending directions perpendicular to each other. The plurality of recesses are arranged in a two-dimensional matrix, and the diffusion sheet and the pair of prism sheets are arranged so that an intersecting angle between an arrangement direction of the plurality of recesses and the prism extending direction is 20° or more and 70° or less.

With the same light sources, the same electric power, and the same optical sheet layer configuration, the method of the present disclosure for manufacturing the backlight unit enables higher luminance than when the angle difference between the arrangement direction of the recesses (inverted quadrangular pyramids) of the diffusion sheet and the prism extending direction of the prism sheets is near 0° or near 90°. Thus, a backlight unit capable of achieving a high-luminance screen with low power can be obtained.

According to the present disclosure, a high-luminance screen can be achieved with low power in a backlight unit.

BRIEF DESCRIPTION OF THE DRAWINGS

FIG. 6 is diagrams showing arrangement angles of the diffusion sheets (sheet with inverted pyramid shapes) and the prism sheet in the optical sheet laminate of the embodiment.

FIG. 7 is a diagram showing variation in luminance when the arrangement angle of the diffusion sheet (sheet with inverted pyramid shapes) is changed in the optical sheet laminate of the embodiment.

FIG. 8 is a diagram showing variation in luminance when the arrangement angle of the upper prism sheet is changed in the optical sheet laminate of the embodiment.

DETAILED DESCRIPTION

Embodiment

An optical sheet laminate, a backlight unit, a liquid crystal display device, an information apparatus, and a method for manufacturing the backlight unit of an embodiment will be described below with reference to the drawings. Note that the scope of the present disclosure is not limited to the following embodiments, and may be altered in any way within the scope of the technical concept of the present disclosure.

<Configuration of Liquid Crystal Display Device>

Figure 1:
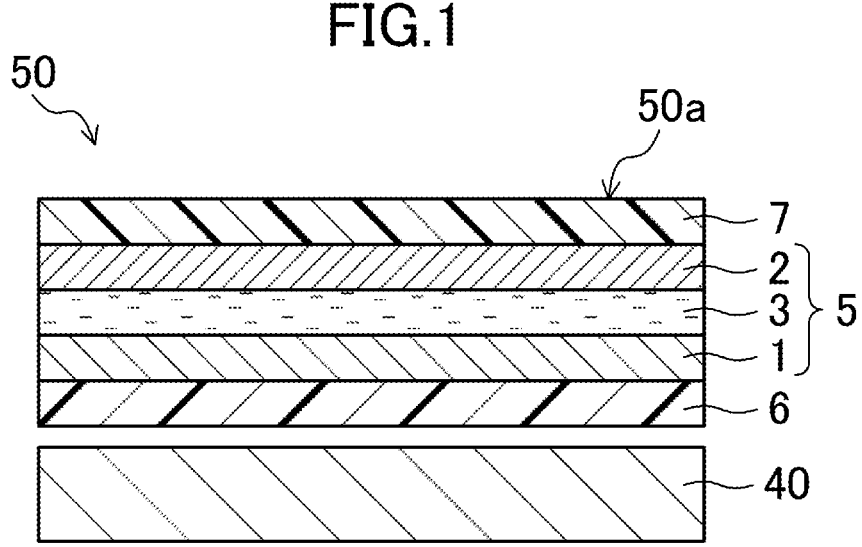
FIG. 1 is a cross-sectional view of a liquid crystal display device including a backlight unit of an embodiment.

As shown in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 sandwiched therebetween.

The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50a of the liquid crystal display device 50 viewed from the front (the top in FIG. 1) is basically a rectangle or a square. Alternatively, the shape may be any shape such as a rectangle with rounded corners, an oval, a circle, a trapezoid, or the shape of an instrument panel of an automobile.

The liquid crystal display device 50 applies a voltage of a predetermined magnitude to the liquid crystal layer 3 in sub-pixels corresponding to pixel electrodes, thereby changing the alignment state of the liquid crystal layer 3. This adjusts the transmittance of light incident from the backlight unit 40 through the first polarizing plate 6. The light whose transmittance is adjusted is emitted through the second polarizing plate 7 to display an image.

The liquid crystal display device 50 of this embodiment is used as a display apparatus built in various information apparatuses (e.g., in-vehicle devices such as car navigation systems; personal computers; mobile phones; portable information equipment such as laptops and tablet computers; portable game machines; copying machines; ticket vending machine; automated teller machines; and the like).

The TFT substrate 1 includes, e.g., a plurality of TFTs arranged in a matrix on a glass substrate, an interlayer insulating film arranged in such a manner as to cover the TFTs, a plurality of pixel electrodes arranged in a matrix on the interlayer insulating film and connected to the TFTs, respectively, and an alignment film arranged in such a manner as to cover the pixel electrodes. The CF substrate 2 includes, e.g., a black matrix arranged in a lattice manner on a glass substrate, a color filter including a red layer, a green layer, and a blue layer arranged between each lattice of the black matrix, a common electrode arranged in such a manner as to cover the black matrix and the color filter, and an alignment film arranged in such a manner as to cover the common electrode. The liquid crystal layer 3 is made of, e.g., a nematic liquid crystal material containing liquid crystal molecules having electro-optical characteristics. The first polarizing plate 6 and the second polarizing plate 7 each includes, e.g., a polarizer layer having a polarization axis in one direction, and a pair of protective layers arranged in such a manner as to sandwich the polarizer layer.

<Configurations of Backlight Unit and Optical Sheet Laminate>

Figure 2:
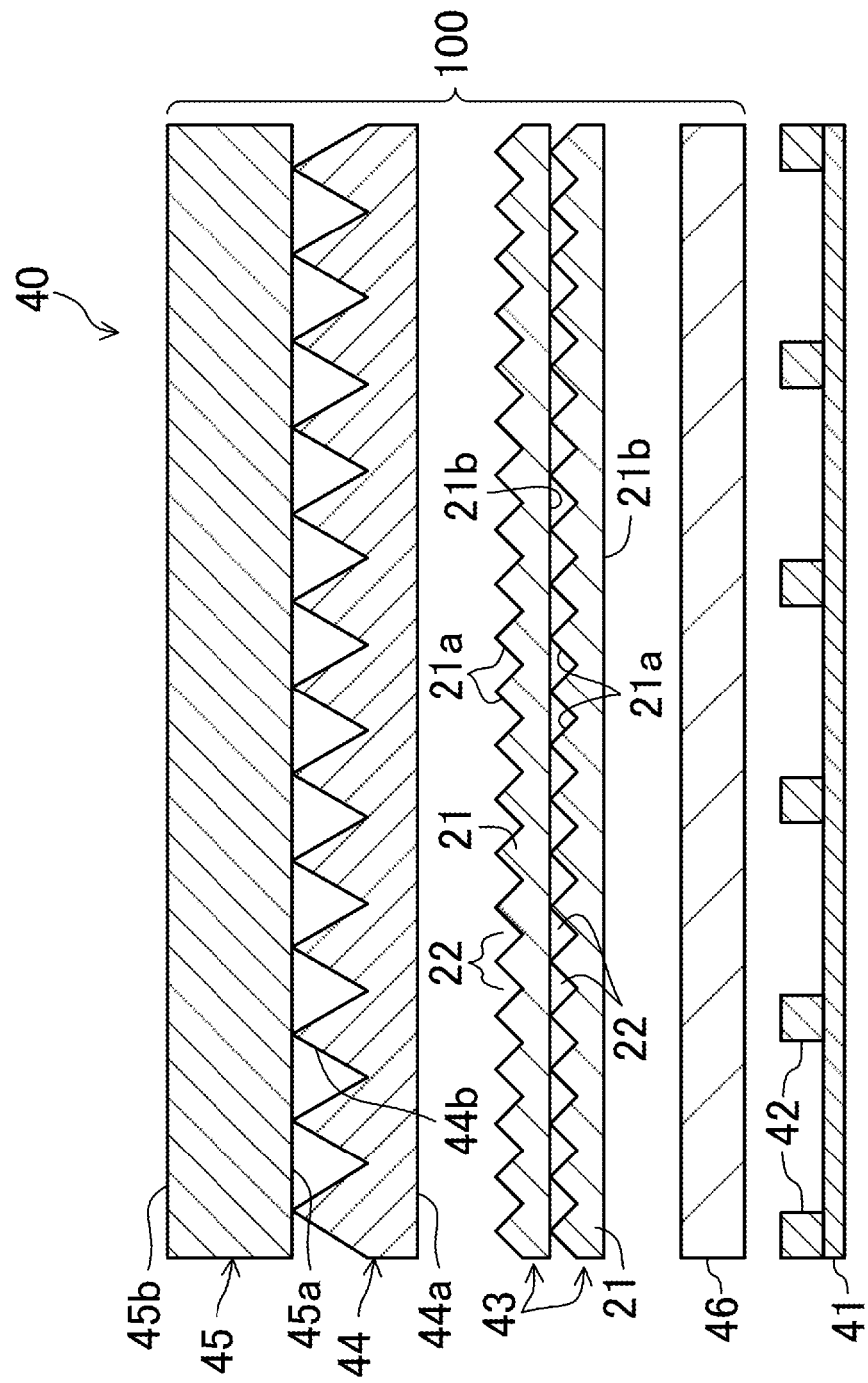
FIG. 2 is a cross-sectional view of a backlight unit containing an optical sheet laminate of the embodiment.

As shown in FIG. 2, the backlight unit 40 includes a reflection sheet 41, and a plurality of blue light sources 42 two-dimensionally arranged on the reflection sheet 41, and an optical sheet laminate 100 provided above the plurality of blue light sources 42. The optical sheet laminate 100 includes a diffusion sheet 43 arranged above the blue light sources 42, and a pair of prism sheets 44 and 45 provided above the diffusion sheet 43 (i.e., provided closer to the display screen 50a). The optical sheet laminate 100 includes a color conversion sheet 46 between the blue light sources 42 and the diffusion sheet 43.

In this embodiment, the diffusion sheet 43 includes, e.g., two diffusion sheets each having the same structure and layered in the backlight unit 40. The diffusion sheet 43 may include one diffusion sheet, or three or more diffusion sheets in layers. In particular, the diffusion sheet 43 may include one diffusion sheet when the luminance uniformity can be sufficiently increased by precise arrangement or the like of the blue light sources 42 of the backlight unit 40. The pair of prism sheets 44 and 45 may be a lower prism sheet 44 and an upper prism sheet 45 having prism extending directions (directions in which prism ridges extend) perpendicular to each other. The color conversion sheet 46 may be arranged between the diffusion sheet 43 and the pair of prism sheets 44 and 45.

The reflection sheet 41 is formed of, e.g., a white polyethylene terephthalate resin film, a silver-deposited film, or the like.

The type of the blue light sources 42 is not particularly limited. For example, an LED element, a laser element, or the like may be adopted, and an LED element may be adopted for the sake of costs, productivity, and the like. To adjust a light emission angle of each LED, a lens may be attached to the LED element. The blue light sources 42 emit light of x<0.24, y<0.18 in the CIE1931 color coordinates, for example. When the blue light sources 42 are configured by LED elements, the LED elements (chips) may have a rectangular shape in a plan view, where each side may be 10 μm or more (preferably 50 μm or more) and 20 mm or less (preferably 10 mm or less, more preferably 5 mm or less). The LED chips of several mm square may be arranged two-dimensionally on the reflection sheet 41 at regular intervals. When the plurality of LED chips are arranged at equal intervals, the distance between the centers of two chips adjacent to each other may be 0.5 mm or more (preferably 2 mm or more) and 20 mm or less.

Figure 3:
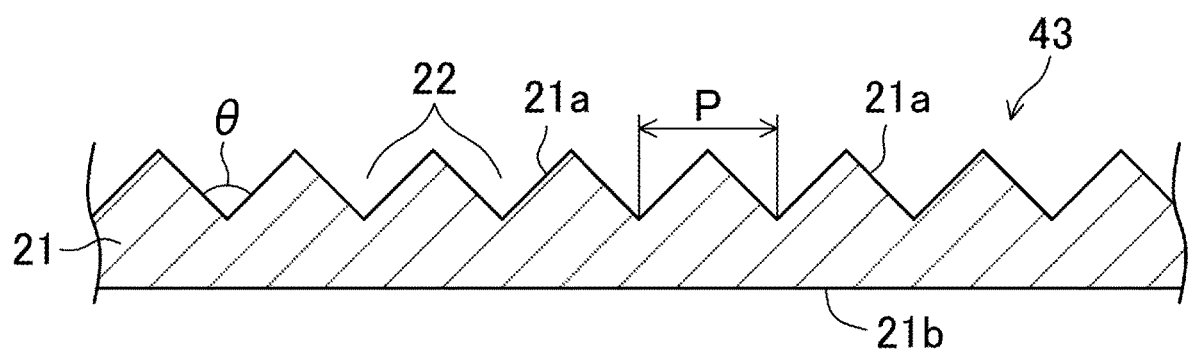
FIG. 3 is a cross-sectional view of a diffusion sheet in the optical sheet laminate of the embodiment.

The diffusion sheet 43 includes a base material layer 21 as shown in FIG. 3. The diffusion sheet 43 (base material layer 21) includes a first surface 21a as a light emitting surface and a second surface 21b as a light incident surface. That is, the diffusion sheet 43 is arranged so that the second surface 21b faces the blue light sources 42. A resin for a matrix of the base material layer 21 is not particularly limited as long as it is formed of a material that transmits light, and may be, e.g., acrylic, polystyrene, polycarbonate, methyl methacrylate/styrene copolymer (MS) resin, polyethylene terephthalate, polyethylene naphthalate, cellulose acetate, polyimide, or the like. The base material layer 21 may contain a diffusing agent or other additives, or may be substantially free of additives. The additives that the base material layer 21 can contain are not particularly limited, but examples of the additives include silica, titanium oxide, aluminum hydroxide, and barium sulfate as inorganic particles, as well as acrylic, acrylonitrile, silicone, polystyrene, and polyamide as organic particles.

The thickness of the light diffusion sheet 43 is not limited, but may be, e.g., 0.1 mm or more and 3 mm or less (preferably 2 mm or less, more preferably 1.5 mm or less, and further more preferably 1 mm or less). The diffusion sheet 43 having a thickness exceeding 3 mm makes it difficult to reduce the thickness of the liquid crystal display. The diffusion sheet 43 having a thickness of less than 0.1 mm makes it difficult to achieve the luminance uniformity. The diffusion sheet 43 may be in the form of a film or a plate.

Figure 4:
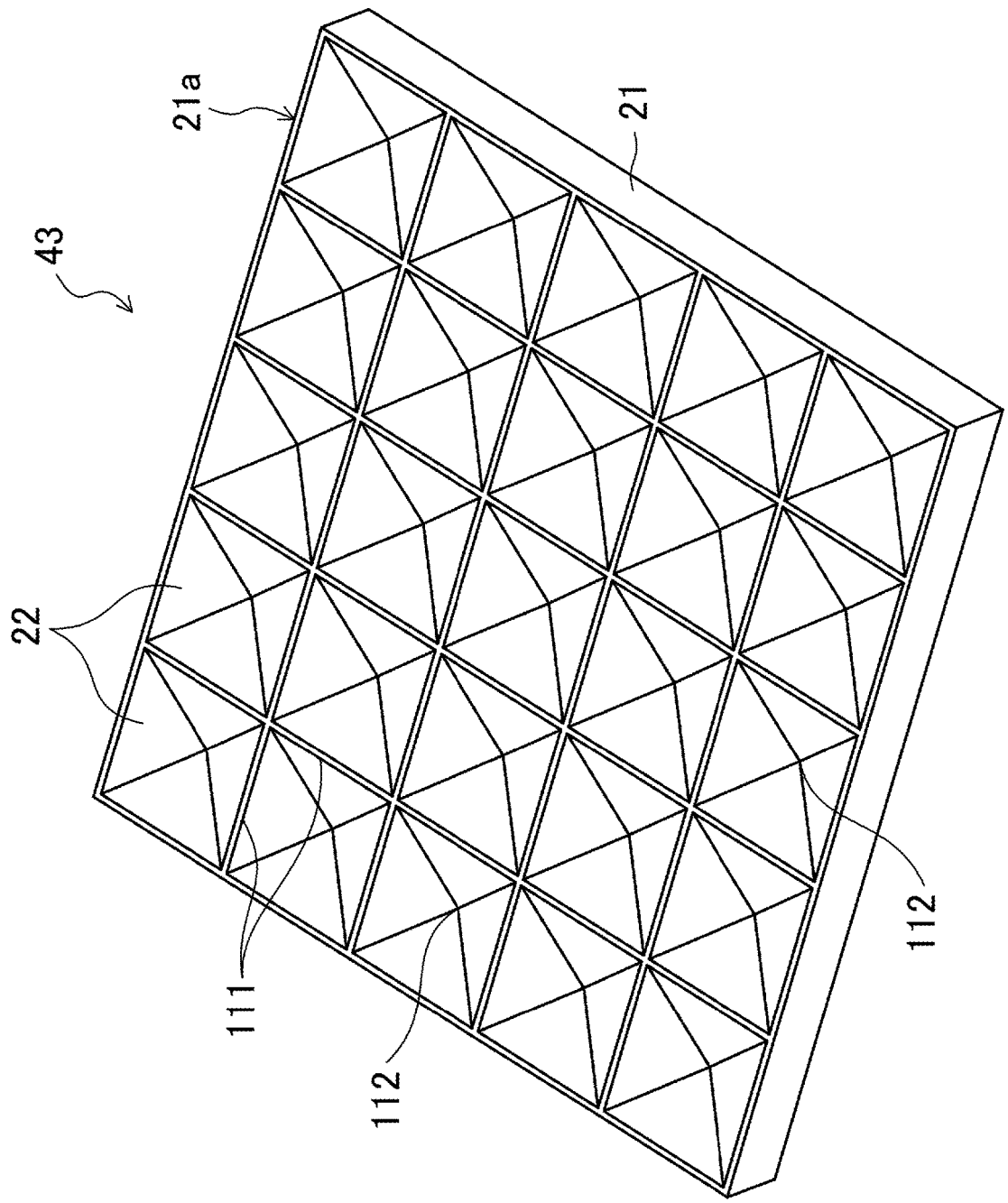
FIG. 4 is a perspective view of a diffusion sheet in the optical sheet laminate of the embodiment.

On the first surface 21a of the light diffusion sheet 43, a plurality of recesses 22 having a substantially inverted quadrangular pyramid shape (inverted pyramid shape) are arranged in a two-dimensional matrix as shown in FIG. 4. In other words, the plurality of recesses 22 are arranged along two directions perpendicular to each other. The recesses 22 adjacent to each other are parted by a ridge 111. The ridge 111 extends along the two directions in which the recesses 22 are arrayed. A center (apex of the inverted pyramid) 112 of the recess 22 is a deepest portion of the recess 22. Although FIG. 4 illustrates that the recesses 22 are arranged in a 5×5 matrix for simplicity, the actual number of the recesses 22 is much larger. In a two-dimensional array of the plurality of recesses 22, the recesses 22 may be arranged on the first surface 21a without a space therebeweeen, or may be arranged with a predetermined space therebetween. Some of the recesses 22 may be randomly arranged to the extent that the light diffusing effect is not lost.

The apex angle θ of the recess 22 may be, e.g., 90°. The recesses 22 may be arranged at an arrangement pitch p of, e.g., 100 μm. The depth of the recess 22 may be, e.g., 50 μm. The apex angle θ of the recess 22 is an angle formed by cross-sectional lines of a pair of inclined surfaces of the recess 22, where the cross-sectional lines appear in a cross section (longitudinal cross-section) when the recess 22 is cut by a plane perpendicular to an arrangement surface of the light diffusion sheet 43, such that the plane passes through the center of the recess 22 (apex 112 of the inverted pyramid) and vertically traverses the pair of inclined surfaces of the recess 22. The arrangement pitch p of the recesses 22 means a distance between the centers of the recesses 22 (apexes of the inverted pyramids 112) adjacent to each other (i.e., distance in a direction parallel to the arrangement surface of the diffusion sheet 43).

The second surface 21b of the diffusion sheet 43 may be, e.g., a flat surface (mirror surface) or an embossed surface. The diffusion sheet 43 may have a single layer structure consisting of the base material layer 21 with the first surface 21a having an uneven shape (recesses 22). The diffusion sheet 43 may have a double layer structure consisting of a base material layer having two flat surfaces and a layer having one uneven surface. The diffusion sheet 43 may have a triple or more layer structure including a layer having one uneven surface. The method for manufacturing the diffusion sheet 43 is not particularly limited. For example, extrusion molding, injection molding, or the like may be employed.

A single layer diffusion sheet having an uneven surface may be manufactured by extrusion molding as follows. First, plastic particles as pellets with a diffusing agent (and maybe plastic particles as pellets without a diffusing agent together) are introduced into a single-screw extruder. Then, the plastic particles are heated, molten, and kneaded. After that, the molten resin extruded from a T-die is sandwiched and cooled between two metal rolls, then transported by guide rolls, and cut off into sheet plates by a sheet cutter machine to produce diffusion sheets. Here, the molten resin is sandwiched using the metal roll having a surface with an inverted shape of desired unevenness, which will be transferred onto the resin. This allows for shaping of diffusion sheets having surfaces with the desired unevenness. The surface shapes of the rolls are not perfectly transferred onto the resin, and thus may be designed in consideration of how completely the shapes are transferred.

If a two-layered diffusion sheet with uneven surfaces is manufactured by extrusion molding, for example, plastic particles as pellets necessary for forming each layer may be introduced into each of two single-screw extruders. Then, the same procedure may be performed for each layer, and the fabricated sheets may be layered.

Alternatively, the two-layered diffusion sheet with an uneven surface may be manufactured as follows. First, plastic particles as pellets necessary for forming each layer are introduced into each of two single-screw extruders, molten by heating, and kneaded. Then, molten resin formed into each layer is introduced into a single T-die so that molten resins are layered in the T-die. Then, the layered molten resins extruded from the T-die are sandwiched and cooled between two metal rolls. After that, the layered molten resins are transported by guide rolls, and cut off into sheet plates using a sheet cutter machine, thus yielding a two-layered diffusion sheet with an uneven surface.

Alternatively, the diffusion sheet may be manufactured by shape-transfer using ultraviolet (UV) as follows. First, an uncured ultraviolet curable resin is filled in a roll having an inverted shape of an uneven shape to be transferred, and a base material is pressed onto the resin. Next, with the roll filled with UV-curing resin and the base material in one piece, the resin is cured by UV irradiation. Next, the sheet to which the uneven shape has been transferred by using the resin is released from the roll. Finally, the sheet is irradiated with ultraviolet rays again to completely cure the resin, thereby producing a diffusion sheet having an uneven surface.

In the present disclosure, the term "substantially inverted quadrangular pyramid" is used in consideration of difficulty in formation of a recess having a geometrically exact inverted quadrangular pyramid shape by an ordinary shape transfer technique. However, the "substantially inverted quadrangular pyramid" encompasses shapes that can be regarded as a true or approximately inverted quadrangular pyramid. Further, "substantial(ly)" XX means that shapes can be approximated to the XX, and "substantially inverted quadrangular pyramids" means shapes that can be approximated to the inverted quadrangular pyramids. For example, the "substantially inverted quadrangular pyramid" includes an "inverted truncated quadrangular pyramid" which has a flat apex and of which the area of the apex is so small that the advantages of the present invention are not lost. The "substantially inverted quadrangular pyramid" also includes a deformation of "inverted quadrangular pyramid" with unavoidable shape variations due to the processing accuracy of industrial production.

The prism sheets 44 and 45, through which the light rays need to pass, are formed mainly of a transparent (e.g., colorless and transparent) synthetic resin. The prism sheets 44 and 45 may be formed as one piece. The lower prism sheet 44 includes a base material layer 44a and an array of a plurality of prism projections 44b stacked on the surface of the base material layer 44a. Similarly, the upper prism sheet 45 includes a base material layer 45a and an array of a plurality of prism projections 45b stacked on the surface of the base material layer 45a. The prism projections 44b and 45b are stacked in a stripe pattern on the surfaces of the base material layers 44a and 45a, respectively. The prism projections 44b and 45b are triangular prisms and have back surfaces that are in contact with the surfaces of the base material layers 44a and 45a, respectively. The extending direction of the prism projections 44b and the extending direction of the prism projections 45b are perpendicular to each other. Accordingly, light rays incident from the diffusion sheet 43 can be refracted in the normal direction by the lower prism sheet 44, and light rays emitted from the lower prism sheet 44 can be further refracted by the upper prism sheet 45 in a direction substantially perpendicular to the display screen 50a.

The lower limit of the thickness of the prism sheets 44 and 45 (the height from the back surface of the base material layer 44a and 45a to the apex of the prism projections 44b and 45b) is preferably approximately 50 μm, and more preferably approximately 100 μm. The upper limit of the thickness of the prism sheets 44 and 45 may be, e.g., approximately 200 μm, and more preferably approximately 180 μm. The lower limit of the pitch of the prism projections 44b and 45b in the prism sheets 44 and 45 is preferably approximately 20 μm, and more preferably approximately 25 μm. The upper limit of the pitch of the prism projections 44b and 45b in the prism sheets 44 and 45 is preferably approximately 100 μm, and more preferably approximately 60 μm. The apex angle of the prism projections 44b and 45b may be, e.g., 85° or more and 95° or less. The lower limit of the refractive index of the prism projections 44b and 45b may be 1.5, and more preferably 1.55. The upper limit of the refractive index of the prism projections 44b and 45b may be 1.7.

The prism sheets 44 and 45 may include the base material layers 44a and 45a and the prism projections 44b and 45b, where the prism projections 44b and 45b to which the shape transfer is applied by using an UV curable acryl-based resin are provided on the base material layers 44a and 45a made of, e.g., a PET (polyethylene terephthalate) film, or where the prism projections 44b and 45b are formed as a one piece with the base material layers 44a and 45a, respectively.

The color conversion sheet 46 is a wavelength conversion sheet for converting light emitted from the blue light source 42 into light having a wavelength of a certain color (e.g., green or red) as a peak wavelength. The color conversion sheet 46 converts, e.g., blue light with a wavelength of 450 nm into green light with a wavelength of 540 nm and red light with a wavelength of 650 nm. In this case, when the blue light source 42 emitting blue light with a wavelength of 450 nm is used, the color conversion sheet 46 partially converts the blue light into green and red light. Thus, the light transmitted through the color conversion sheet 46 turns into white light. The color conversion sheet 46 may be, e.g., a QD (quantum dot) sheet, a fluorescent sheet, or the like.

Although not shown, a polarizing sheet may be provided above the prism sheets 44 and 45 (i.e., on the side closer to the display screen 50a). The polarizing sheet improves the luminance of the display screen 50a by keeping light emitted from the backlight unit 40 from being absorbed into the first polarizing plate 6 of the liquid crystal display device 50.

Figure 5:
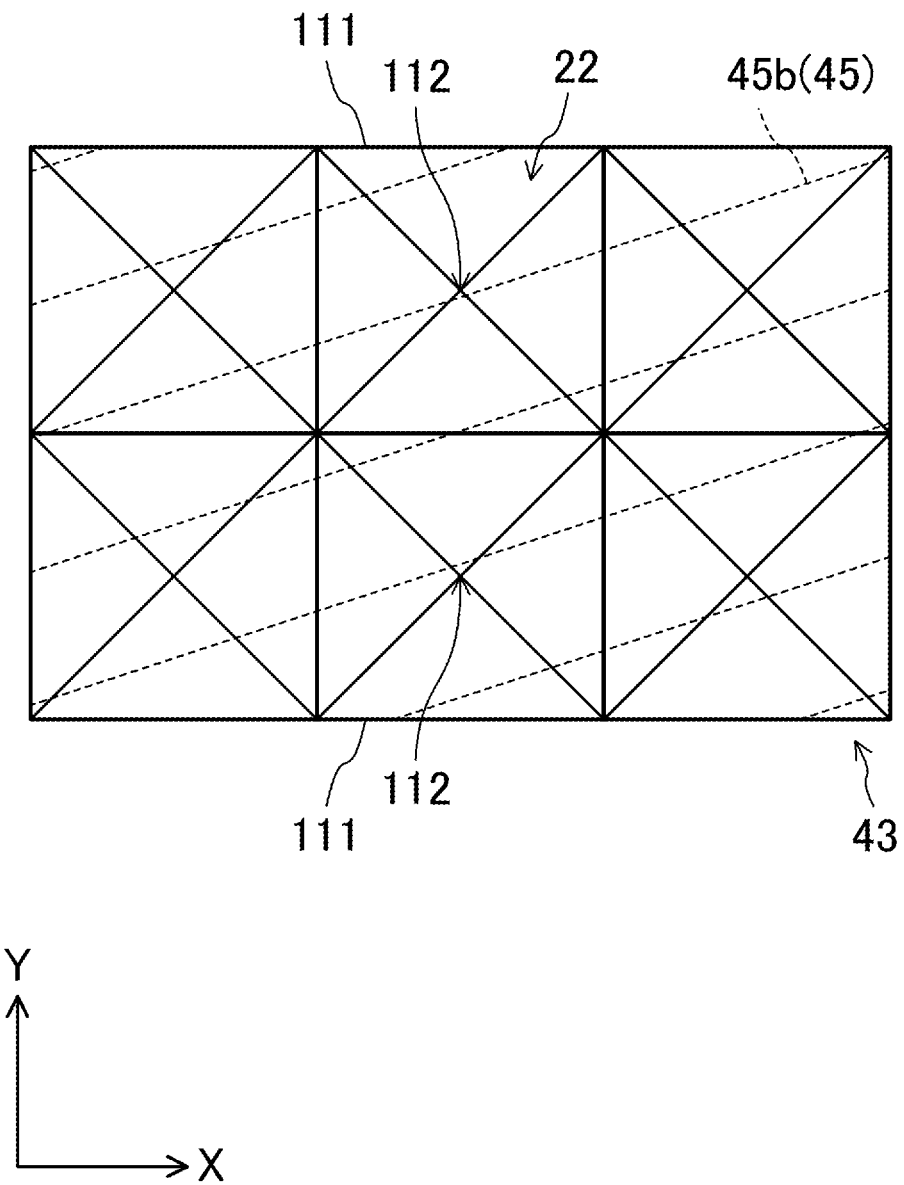
FIG. 5 is a view showing an exemplary relationship between an arrangement direction of recesses on the diffusion sheet and a prism extending direction of a prism sheet in the optical sheet laminate of the embodiment.

In the optical sheet laminate 100 of the embodiment described above, the arrangement directions (X direction and Y direction) of the recesses 22 of the diffusion sheet 43 intersect with the extending directions of the prism projections 44b and 45b of the prism sheets 44 and 45 at an angle of 20° or more and 70° or less, more preferably at 25° or more and 35° or less, or 55° or more and 65° or less, as shown in FIG. 5, for example. For the sake of simplicity, FIG. 5 omits illustration of the prism projections 44b. However, the extending direction of the prism projections 44b and the extending direction of the prism projections 45b are perpendicular to each other. Thus, when the extending direction of the prism projections 45b is in the above range of the intersecting angle, the extending direction of the prism projections 44b is also in the above range of the intersecting angle.

<Features of Embodiment>

The optical sheet laminate 100 of this embodiment is incorporated into the backlight unit 40 having the blue light sources 42. The optical sheet laminate 100 includes the diffusion sheet 43 having the first surface 21a provided with the plurality of recesses 22 having a substantially inverted quadrangular pyramid shape, and the pair of prism sheets 44 and 45 having the prism projections 44b and 45b having the extending directions (hereinafter also referred to as prism extending directions) perpendicular to each other. The diffusion sheet 43 includes one or a plurality of diffusion sheets in layers. The plurality of recesses 22 are arranged in a two-dimensional matrix, and the intersecting angle between an arrangement direction of the plurality of recesses 22 and the prism extending direction is 20° or more and 70° or less.

With the same light sources, the same electric power, and the same optical sheet layer configuration, the optical sheet laminate 100 of this embodiment enables higher luminance than when the angle difference between the arrangement direction of the recesses (inverted quadrangular pyramids) of the diffusion sheet 43 and the prism extending direction of the prism sheets 44 and 45 is near 0° or near 90°. Thus, a high-luminance screen can be achieved with low power in the backlight unit 40.

The optical sheet laminate 100 of this embodiment enables still higher luminance when the intersecting angle is 25° or more and 35° or less, or 55° or more and 65° or less.

The backlight unit 40 of this embodiment is built in the liquid crystal display device 50 and leads light emitted from the blue light sources 42 toward the display screen 50a via the color conversion sheet 46. The backlight unit 40 has the optical sheet laminate 100 between the display screen 50a and the blue light sources 42, and the diffusion sheet 43 is arranged between the blue light sources 42 and the prism sheets 44 and 45.

The backlight unit 40 of this embodiment includes the optical sheet laminate 100 of this embodiment, and thus a high luminance screen can be achieved with low power.

In the backlight unit 40 of this embodiment, the blue light sources 42 may be arranged on the reflection sheet 41 provided on an opposite side of the display screen 50a when viewed from the diffusion sheet 43. This causes multiple reflections between the diffusion sheet 43 and the reflection sheet 41 thus causing further light diffusion, and thus the luminance uniformity is improved.

In the backlight unit 40 of this embodiment, the diffusion sheet 43 may include a plurality of diffusion sheets in layers and be arranged between the prism sheets 44 and 45 and the blue light sources 42. Accordingly, the plurality of diffusion sheets 43 repeatedly diffuse the light traveling straight from the blue light sources 42, thus improving the luminance uniformity.

In the backlight unit 40 of this embodiment, when the distance between the blue light sources 42 and the diffusion sheet 43 is 5 mm or less, the backlight unit 40 can be downsized. In anticipation of the future reduction in thicknesses of medium-to-small-sized liquid crystal displays, the distance between the blue light sources 42 and the diffusion sheet 43 may be preferably 2.5 mm or less, more preferably 1 mm or less, and ultimately 0 mm.

In the backlight unit 40 of the present embodiment, the color conversion sheet 46 may be arranged between the blue light sources 42 and the diffusion sheet 43, or between the diffusion sheet 43 and the prism sheets 44 and 45. Accordingly, the color conversion sheet 46 can convert light emitted from the blue light source 42 into white light.

A method for manufacturing the backlight unit 40 of this embodiment includes arranging one or a plurality of diffusion sheets 43 between the blue light sources 42 and the display screen 50a, where the diffusion sheet has a plurality of recesses 22 having a substantially inverted quadrangular pyramid shape; and arranging a pair of prism sheets 44 and 45 between the display screen 50a and the one or plurality of diffusion sheets 43, where the pair of prism sheets 44 and 45 have prism extending directions perpendicular to each other. The plurality of recesses 22 are arranged in a two-dimensional matrix, and the one or more diffusion sheets 43 and the pair of prism sheets 44 and 45 are arranged so that the intersecting angle between an arrangement direction of the plurality of recesses 22 and the prism extending direction is 20° or more and 70° or less.

With the same light sources, the same electric power, and the same optical sheet layer configuration, the method of this embodiment for manufacturing the backlight unit 40 enables higher luminance than when the angle difference between the arrangement direction of the recesses (inverted quadrangular pyramids) of the diffusion sheet 43 and the prism extending direction of the prism sheets 44 and 45 is near 0° or near 90°. Thus, the backlight unit 40 capable of achieving a high-luminance screen with low power can be obtained.

The liquid crystal display device 50 of this embodiment includes the backlight unit 40 of this embodiment and the liquid crystal display panel 5. Thus, a high-luminance screen can be achieved with low power by the backlight unit 40. Information apparatuses (e.g., portable information equipment such as laptop computers, tablet computers, and the like) containing the liquid crystal display device 50 can also achieve the similar advantages.

Example

An example will be described below.

In this example, an optical sheet laminate 100 was used which included two diffusion sheets 43 having a thickness of 130 μm, having the same structure, and layered in the same orientation; and a lower prism sheet 44 and an upper prism sheet 45 having prism extending directions perpendicular to each other, where the lower prism sheet 44 and the upper prism sheet 45 were arranged above the diffusion sheets 43. In this example, two types of the optical sheet laminate 100 were prepared, one of which included the color conversion sheet 46 arranged below the diffusion sheet 43, and the other one of which did not include the color conversion sheet 46, where the color conversion sheet 46 was made from a QD sheet.

The diffusion sheets 43 each having recesses 22 were formed, where the recesses 22 had an inverted pyramid shape with an apex angle of 90° and a depth of 50 μm, and were arranged two-dimensionally at a pitch of 100 μm on a transparent polycarbonate sheet with a thickness of 80 μm by using an UV-curable resin having a refractive index of 1.587. The diffusion sheet 43 was arranged so that the arrangement surface (first surface 21a) for the recesses 22 served as a light emitting surface. The second surface 21b of the diffusion sheet 43 was a flat surface (mirror surface).

The prism sheets 44 and 45 including base material layers 44a and 45a and prism projections 44b and 45b were formed, where the prism projections 44b and 45b formed by using an UV-curable acryl-based resin made from acrylate were provided on the base material layers 44a and 45a made of a PET film. The lower prism sheet 44 had a total thickness of 145 μm, and had the prism projections 44b having a height of 12 μm and an apex angle of 94° and arranged at a pitch of 25 μm. The upper prism sheet 45 had a total thickness of 128 μm, and had the prism projections 45b having a height of 24 μm and an apex angle of 93° and arranged at a pitch of 51 μm.

Blue light sources 42 were arranged below the optical sheet laminate 100 of this example (i.e., arranged closer to the diffusion sheet 43). The luminance of light having passed the optical sheet laminate 100 was evaluated with variation in the layout relationship between the diffusion sheet 43 and the prism sheets 44 and 45. As the blue light sources 42, an LED array was used which included blue LEDs having a peak wavelength of 450 nm (full width at half maximum: 16 nm) and arranged two-dimensionally at a pitch of 2.8 mm.

As shown in FIG. 6, in an initial state for the luminance measurement, the diffusion sheet 43 was arranged so that one of the arrangement directions of the recesses 22 coincided with a reference direction (X-axis direction) (i.e., arrangement angle of 0°); the lower prism sheet 44 was arranged so that the extending direction of the prism projections 44b was rotated counterclockwise by 102° on the X-axis (i.e., arrangement angle of 102°); and the upper prism sheet 45 was arranged so that the extending direction of the prism projections 45b was rotated counterclockwise by 12° on the X-axis (i.e., arrangement angle of 12°).

In a first luminance measurement, the arrangement direction (arrangement angle) of the two diffusion sheets 43 (sheets with inverted pyramid shapes) was rotated counterclockwise from the initial state by 10° each time and 180° in total in order to measure the luminance change. In a second luminance measurement for a comparison, the arrangement direction (arrangement angle) of two prism sheets 44 and 45 was rotated counterclockwise from the initial state by 10° each time and 180° in total in order to measure the luminance change.

In each luminance measurement, the optical sheet laminate 100 of this example was arranged above the blue light sources 42 (LED array), and a transparent glass plate was placed thereabove to reduce floating of the sheets. Then, the two-dimensional color luminance meter UA-200 manufactured by Topcon Technohouse Corporation was used to measure the luminance in a range of 33 mm square in the vertically upward direction (i.e., in the direction from the LED array towards the glass plate). For two-dimensional luminance distribution images obtained, variation in the light emitting intensity of each LED was corrected, and filtering process was conducted to reduce bright/dark spots attributed to foreign materials and the like. Then, the average of the luminance was calculated for all the pixels.

FIG. 7 and FIG. 8 show the luminance changes obtained in the first luminance measurement and the second luminance measurement, respectively. In FIG. 7 and FIG. 8, the horizontal axis represents "the arrangement angle of the upper prism sheet 45" minus "the arrangement angle of the diffusion sheet 43 (sheet having the inverted pyramid shapes)" (hereinafter referred to as simply "arrangement angle difference" in some cases). The arrangement angle difference in the initial state is 12° (see FIG. 6).

In FIG. 7, the "arrangement angle difference" decreases by 10° each time as the diffusion sheet 43 rotates. In FIG. 8, the arrangement angle difference increases by 10° each time as the upper prism sheet 45 rotates. Since the diffusion sheet 43 has an equivalent shape at arrangement angles of 0° (180°) and 90° (270°), the "arrangement angle difference" was converted as follows. When the "arrangement angle difference" is a negative value, a multiple of 90° is added to the "arrangement angle difference" for conversion into a value between 0° and 90°. When the "arrangement angle difference" exceeds 90°, a multiple of 90° is subtracted from the "arrangement angle difference" for conversion into a value between 0° and 90°. Accordingly, there are a plurality of measured luminance values on the vertical axis for the same "arrangement angle difference" on the horizontal axis. The "arrangement angle difference" converted as described above is equal to the intersecting angle between the arrangement direction of the recesses 22 of the diffusion sheet 43 and the extending direction of the prism projections 44b and 45b of the prism sheets 44 and 45 (hereinafter, simply referred to as "intersecting angle" in some cases).

In FIG. 7 and FIG. 8, the luminance is represented as a relative luminance, where the measured luminance values in the initial state (where the "arrangement angle difference" is 12°) of the optical sheet laminate 100 provided with the color conversion sheet 46 is 100%.

As shown in FIG. 7 and FIG. 8, regardless of the presence or absence of the color conversion sheet 46, the luminance increases more significantly when the "arrangement angle difference" ranges between 20° to 70° (i.e., the "intersecting angle" ranges between 20° to 70°) than when the "arrangement angle difference" is near 0° or near 90° (i.e., the "intersecting angle" is near 0° or near 90°). In particular, the relative luminance reaches a maximum value when the "arrangement angle difference" is near 30° or near 60° (i.e., the "intersecting angle" is near 30° or near 60°). Then, relatively high luminance is obtained within a ±5° range of the "arrangement angle difference" that yields the maximum value.

As described above, it has been found that the optical sheet laminate 100 of this example enables higher luminance when the "intersecting angle" ranges between 20° to 70°, and enables significantly higher luminance when the "intersecting angle" ranges between 25° to 35° or between 55° to 65°, whether the arrangement angle of the diffusion sheet 43 or the arrangement angle of the prism sheets 44 and 45 is changed.

OTHER EMBODIMENTS

In the above embodiment (including the example: the same applies to the description below), the optical sheet laminate 100 includes the diffusion sheet 43, the prism sheets 44 and 45, and the color conversion sheet 46. Alternatively, the optical sheet laminate 100 may include other optical sheets than the diffusion sheet 43, the prism sheets 44 and 45, and the color conversion sheet 46.

In the above embodiment, the inverted polygonal pyramid shape of the recesses 22 on the first surface 21a of the diffusion sheet 43 in the optical sheet laminate 100 is an inverted quadrangular pyramid. Alternatively, the inverted polygonal pyramid shape may be other shapes that can be arranged two-dimensionally, such as an inverted triangular shape or an inverted hexagonal shape. Alternatively, an array of projections such as prism projections and the like may be provided in place of the recesses 22 that can be arranged two-dimensionally. The second surface 21b of the diffusion sheet 43 is either a flat surface (mirror surface) or an embossed surface. Alternatively, recesses having an inverted polygonal pyramid shape and capable of being arranged two-dimensionally, or an array of projections such as prism projections may be arranged on the second surface 21b of the diffusion sheet 43.

The above describes the embodiments of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

The invention claimed is:
1. A backlight unit to be built in a liquid crystal display device and leading light emitted from blue light sources toward a display screen via a color conversion sheet, the backlight unit comprising:

an optical sheet laminate comprising:
- a diffusion sheet having surfaces, at least one of which has a plurality of recesses having a substantially inverted quadrangular pyramid shape; and
- a pair of prism sheets having prism extending directions perpendicular to each other, wherein:
- the diffusion sheet includes one or a plurality of diffusion sheets in layers,
- the plurality of recesses are arranged in a two-dimensional matrix, and an intersecting angle between an arrangement direction of the plurality of recesses and the prism extending direction is 20° or more and 70° or less, and
- the diffusion sheet is arranged between the blue light sources and the pair of prism sheets.

2. The backlight unit of claim 1, wherein the intersection angle is 25° or more and 35° or less.

3. The backlight unit of claim 1, wherein the blue light sources are arranged on a reflection sheet provided on an opposite side of the display screen when viewed from the diffusion sheet.

4. The backlight unit of claim 1, wherein the diffusion sheet includes a plurality of diffusion sheets in layers and is arranged between the pair of prism sheets and the blue light sources.

5. The backlight unit of claim 1, wherein a distance between the blue light sources and the diffusion sheet is 5 mm or less.

6. The backlight unit of claim 1, wherein the color conversion sheet is arranged between the blue light sources and the diffusion sheet.

7. The backlight unit of claim 1, wherein the intersection angle is 55° or more and 65° or less.

8. A liquid crystal display device, comprising:
- the backlight unit of claim 1; and
- a liquid crystal display panel.

9. An information apparatus comprising: the liquid crystal display device of claim 8.

10. A method for manufacturing a backlight unit to be built in a liquid crystal display device and leading light emitted from blue light sources toward a display screen via a color conversion sheet, the method comprising:
- arranging one or a plurality of diffusion sheets between the blue light sources and the display screen, where the diffusion sheet has surfaces, at least one of which has a plurality of recesses having a substantially inverted quadrangular pyramid shape; and
- arranging a pair of prism sheets between the diffusion sheet and the display screen, where the pair of prism sheets have prism extending directions perpendicular to each other, wherein
- the plurality of recesses are arranged in a two-dimensional matrix, and the diffusion sheet and the pair of prism sheets are arranged so that an intersecting angle between an arrangement direction of the plurality of recesses and the prism extending direction is 20° or more and 70° or less.

11. The method of claim 10, wherein the intersection angle is 25° or more and 35° or less.

12. The method of claim 10, wherein the intersection angle is 55° or more and 65° or less.

13. The method of claim 10, wherein the blue light sources are arranged on a reflection sheet provided on an opposite side of the display screen when viewed from the diffusion sheet.

14. The method of claim 10, wherein the diffusion sheet includes a plurality of diffusion sheets in layers and is arranged between the pair of prism sheets and the blue light sources.

15. The method of claim 10, wherein a distance between the blue light sources and the diffusion sheet is 5 mm or less.

16. The method of claim 10, wherein the color conversion sheet is arranged between the blue light sources and the diffusion sheet.

* * * * *